United States Patent [19]

Raschke et al.

[11] 4,104,934

[45] Aug. 8, 1978

[54] FIXTURE FOR THREADING-ON AND SIMULTANEOUSLY TURNING THE NUTS OF SEVERAL SCREW BOLTS

[75] Inventors: Klaus Raschke; Volfango Festinori, both of Berlin, Fed. Rep. of Germany

[73] Assignee: Siemens Aktiengesellschaft, Munich, Fed. Rep. of Germany

[21] Appl. No.: 824,097

[22] Filed: Aug. 12, 1977

[30] Foreign Application Priority Data

Aug. 26, 1976 [DE] Fed. Rep. of Germany ....... 2638688

[51] Int. Cl.$^2$ ............................................. B25B 29/02
[52] U.S. Cl. ................................................ 81/57.38
[58] Field of Search ...................... 81/57.38; 254/29 A

[56] References Cited

U.S. PATENT DOCUMENTS 3,844,533  10/1974  Markiewicz et al. ............. 254/29 A
3,877,326   4/1975  Kock et al. ........................ 81/57.38

Primary Examiner—James L. Jones, Jr.
Attorney, Agent, or Firm—Kenyon & Kenyon, Reilly, Carr & Chapin

[57] ABSTRACT

An improved fixture for simultaneously threading-on and turning the nut means of several screw bolts. The fixture comprises a support ring having recesses for receiving each screw bolt and its associated nut means and a separate rotating means for rotating each nut means. In accordance with the invention, each rotating means is associated with a particular recess and includes a stator part disposed in the surfaces of the recess which face the nut means received by that recess. Each stator part includes an a-c winding and thus, forms the stator portion of an asynchronous-type electric motor whose rotor portion is formed by the nut means facing that stator part.

10 Claims, 3 Drawing Figures

FIXTURE FOR THREADING-ON AND SIMULTANEOUSLY TURNING THE NUTS OF SEVERAL SCREW BOLTS

BACKGROUND OF THE INVENTION

1. Field of the Invention

The invention relates to a fixture for threading-on and simultaneously turning the nut means of several screw bolts, necked-down screws, tie rods or the like. More particularly, the invention relates to a fixture wherein a support ring is provided with recesses each for receiving a nut means and its associated screw bolts, and wherein separate turning units functioning as reversible electric motors are fastened to the ring for turning each nut means and a hydraulically tensioning means is provided for stretching each screw bolt.

2. Description of the Prior Art

A fixture of the above-type is disclosed in German Offenlegungsschrift No. 2,258,859. In the aforesaid fixture, the nut means used for tightening and pre-tensioning each screw bolt is provided with external teeth with which a pinion meshes, the latter pinion being driven by an electric motor via a reduction gear. These teeth weaken the nut means and, in addition, cause the force required to rotate the nut means to be applied only at one point along the circumference thereof. As a result, internal thread damage to the nut means can occur, due to tilting moments and one-sided radial forces.

It is an object of the present invention to provide an improved fixture of the above-type wherein threading-on and screwing or unscrewing of the nut means is carried out with a more favorable force-flow.

SUMMARY OF THE INVENTION

The above and other objectives are accomplished in accordance with the principles of the present invention in a fixture of the above type by associating each of the rotating means with a stator part including an a-c winding, which part is disposed in the surfaces of its particular recess which face the nut means received by that recess and forms the stator portion of an asynchronous-type electric motor whose rotor portion is formed by the aforesaid nut means.

With the fixture so formed, the torque required to turn each nut means is thus, generated electrically without physical contact and is uniformly distributed around the entire circumference of the nut means which may include a lower nut portion and an upper extension portion. Moreover, the stator parts required for generating the rotating or travelling field can be easily accommodated in a mechanically suitable manner in the surfaces of the recesses of the support ring. Additionally, since only relatively little power is necessary to drive the nut means it is possible to design the asynchronous electric motors to have a high efficiency. Furthermore, because the nut means are driven only briefly, the removal of the heat generated by losses presents no problem and can be influenced by a suitable choice of the number of poles of the electric motors.

As each nut means functions as a solid rotor of an asynchronous-type motor having no rotor winding, the motor advantageously exhibits a high starting torque characteristic. Should a different torque characteristic be desired, the outside surface of each nut means facing its corresponding stator part can be provided in a suitable manner with a squirrel cage winding.

In order to keep the time required for screwing all the nut means on and off at a minimum, it is advisable to provide the present fixture with rotating means for each nut means and screw bolt. These rotating means can, moreover, be further designed so as to be operable independently of each other. With the number of rotating means equal to that of the nut means and associated screw bolts, the space available for each rotating means, however, becomes smaller than if the fixture included a rotating means for only every second screw bolt and nut means, and the fixture were shifted to tighten the nut means and screw bolts in two operations. The space required for each rotating means can, advantageously, be influenced by feeding the a-c winding of the stator parts of the rotating means with a frequency different from the line frequency, as then there is more latitude with respect to the choice of the number of poles.

To utilize the space optimally, the stator parts can be designed to form electric motors with either radial or axial air gaps. If the nut means of a screw bolt is arranged on a lower portion of the screw bolt for pre-tensioning and tightening purposes, the asynchronous motor formed by the nut means and its corresponding stator part can, advantageously, be designed as an electric motor with an axial air gap. Furthermore, if such a screw bolt is provided with a further nut means on its upper portion which serves for tightening purposes, such further nut means can serve as the rotor of an electric motor with an axial air gap. This permits utilization of not only the cylindrical surfaces but also the end faces of the nut means for generating the rotary motion. In the case of an axial air gap, the stator parts are correspondingly disk-like.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
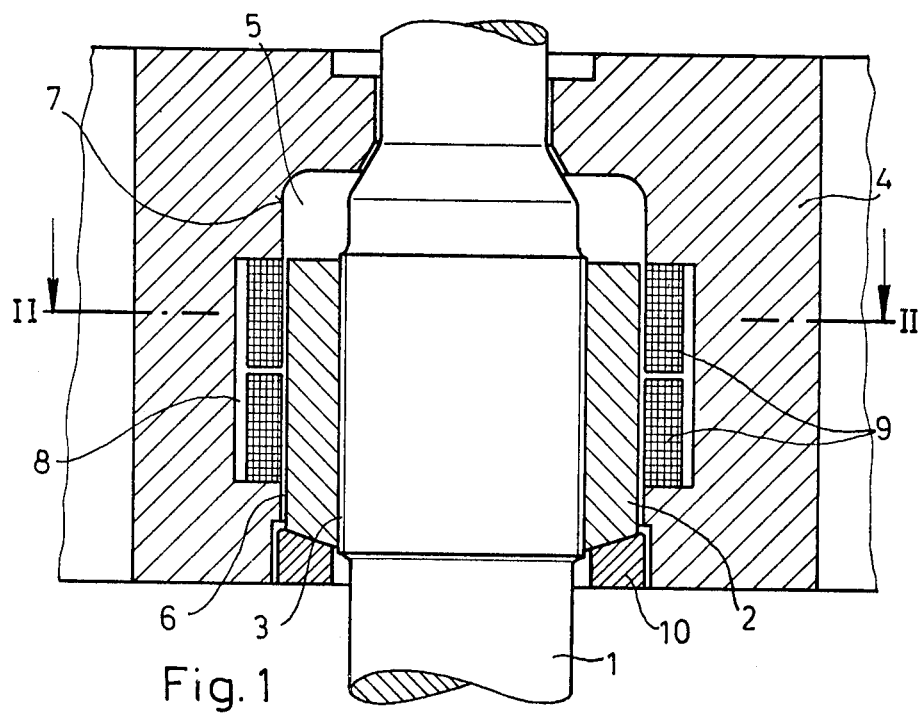
FIG. 1 shows a longitudinal cross section of a fixture in accordance with the principles of the present invention taken along the line I—I of FIG. 2.
Figure 2:
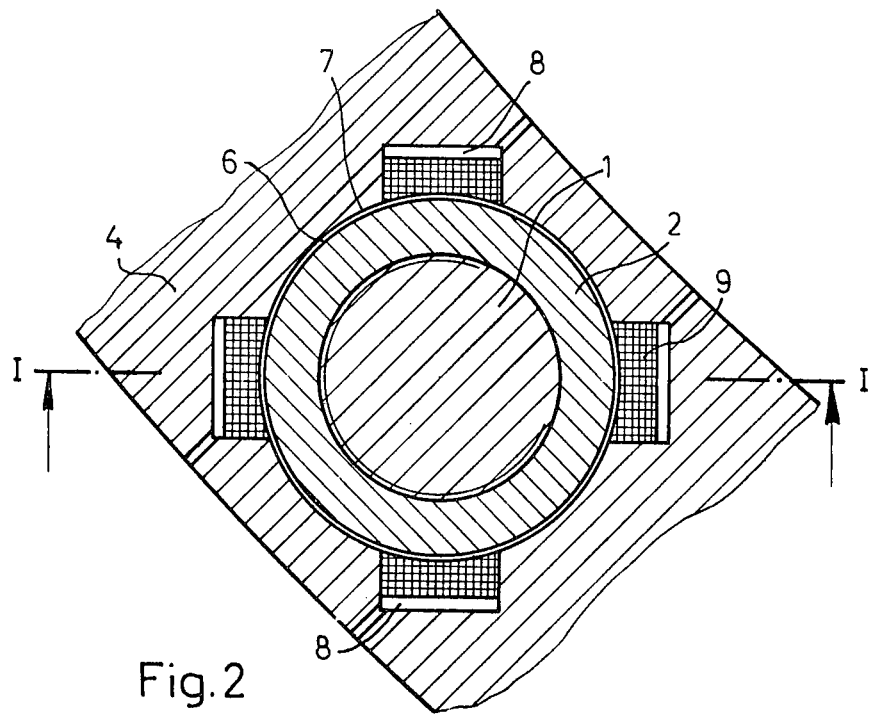
FIG. 2 shows a cross section of the fixture of FIG. 1 taken along the line II—II of FIG. 1.

FIG. 1 shows a fixture in accordance with the principles of the present invention. The fixture is to provide pre-tensioning of a lid by automatically screwing the nuts 2 onto the thread 3 of the screw bolts 1. In the figures, the portion of the fixture associated with only one screw bolt 1 and nut 2 is shown, the remaining portions of the fixture associated with the other screw bolts 1 and their respective nuts 2 being the same.

The fixture portion comprises a support ring 4 having a recess 5 which receives the screw bolt 1 and its respective nut 2, the latter nut 2 being threaded-on when the support ring 4 is put in place. The surface 7 of the recess 5 is further provided with a plurality of slots 8 which are distributed uniformly around the circumference of the surface and which are opposite the cylindrical surface of the nut 2 received by the recess. Disposed in each of the slots 8 is a stator part 9 having the shape of a sector and forming the stator a portion of an asynchronous-type electric motor whose rotor portion is formed by the respective nut 2.

Associated with each of the stator parts 9 is an a-c or three-phase winding which, for the sake of simplicity, has not been shown in the drawing. The slots 8 can each be further provided with a suitable lining which acts as a shield to prevent excessive stray fields from being produced in the support ring.

Rotation of the nuts 2 is realized by applying a single- or three-phase a-c current of suitable frequency, which may differ from the line frequency, to the a-c winding of the stator parts 9. More particularly, the rotating or travelling field produced by the application of the current sets the nut 2, which acts as a solid rotor, in rotation and, thus, turns it on the thread 3. The resultant transmission of the force to the nut 2 is completely uniform, the support ring 4 taking up the counter-torque. The aforesaid rotation of the nut 2 is continued in the desired direction accompanied by corresponding changes in position of the support ring 4, until the end position of the nut 2 is reached at the ring 10.

Using sector-shaped stator parts 9 in the present fixture permits the parts to be readily installed in the slots 8 of the support ring 4 from the side of the recess 5. As a result, the stator parts 9 can be replaced without difficulty. In the fixture of FIG. 1, at each circumferential location two stator parts 9 are arranged one on top of one another. The windings of these two parts are connected, either alternately or simultaneously, to the applied current, depending on the position of the nut 2. However, a single stator part 9 whose height is equal to that of the illustrated two stator parts may also be used at each circumferential location of each slot 8.

Figure 3:
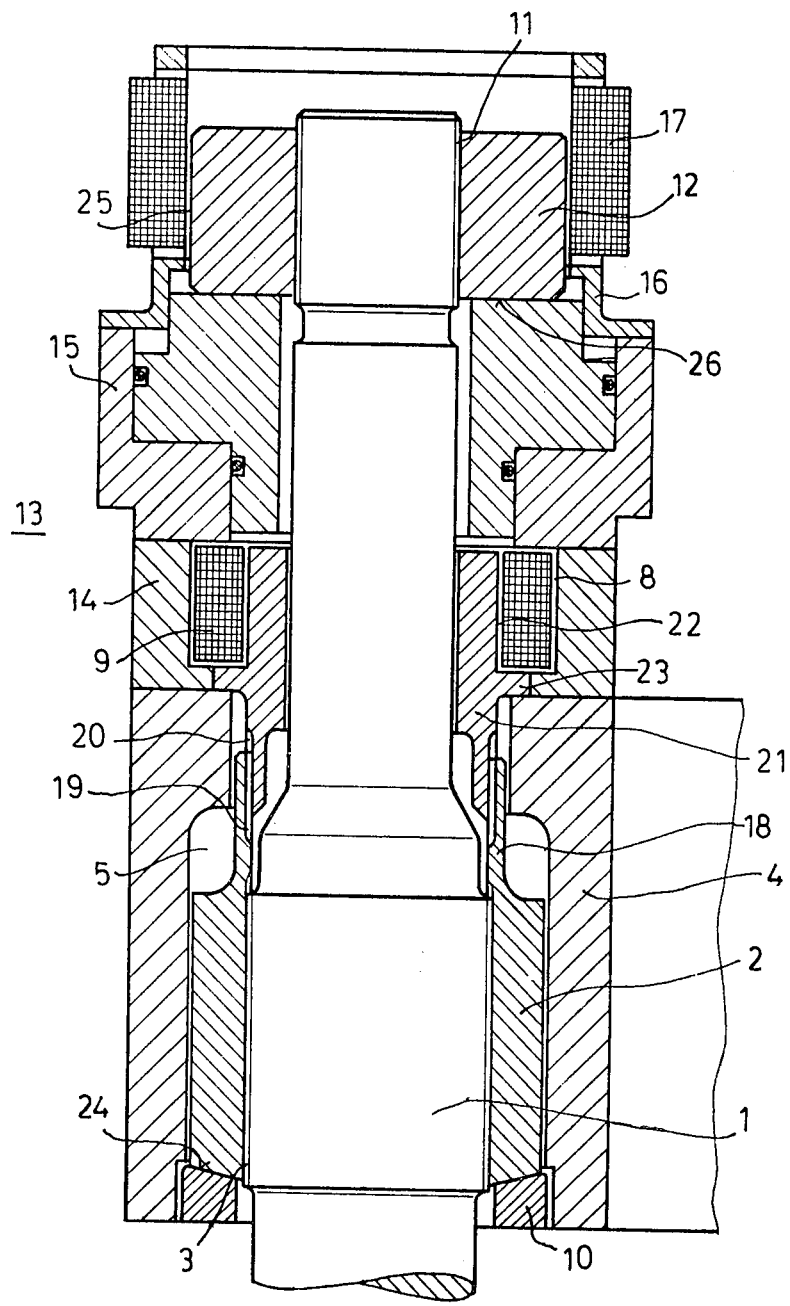
FIG. 3 shows a longitudinal cross section through a further fixture in accordance with the principles of the present invention.

FIG. 3 shows a further embodiment of a fixture in accordance with the principles of the present invention. In FIG. 3, the same reference symbols as used in FIG. 1 have been employed to designate similar parts. The screw bolt 1 is to be employed for tightening the cover of a reactor vessel and is provided at its lower end with a thread 3 for receiving a nut 2 which serves as a means for pre-tensioning the screw bolt and with a second thread 11 at its upper end which receives a nut 12 which serves as a means for tightening the screw bolt. The nuts 2 and 12 each are steel cylinders with internal thread.

A fixture 13 in accordance with the invention is provided for automatically turning or rotating the nuts 2 and 12 and comprises a first support ring 4 having a recess 5 for receiving the lower portion of the screw bolt 1 and the nut 2 and a second support ring 14 having slots 8 for receiving the stator parts 9 which form the stator portion of an asynchronous-type electric motor for causing the rotation of the nut 2. Arranged above the support ring 14 is a portion or means 15 for hydraulically stretching the screw bolt 1. The latter means, in turn, is followed by a further support ring 16 which serves to support the stator parts 17 for causing rotation of the nut 12.

At its upper end face, the nut 2 is drawn to form a sleeve 18 having internal teeth 19 which mesh with the external teeth 20 of a further sleeeve 21. The sleeve 21, thus, forms an axially extending extension which is connected to the nut 2 and has an outer surface 22 which is opposite the stator parts 9 in the slots 8 of the support ring 14. The sleeve 21, is secured in the axial direction by a shoulder 23 having sliding surfaces, thereby permitting the sleeve to freely rotate.

In operation, application of an a-c current to the stator parts 9 causes the sleeve 21 to rotate, the latter rotations being then transmitted via the teeth 19, 20 to the nut 2, which is now screwed up and down on the thread 3 depending on the direction of rotation. To ensure continued engagement of teeth 19 and 20 and, thus, continued rotation of the nut 2, the fixture 13 must be shifted correspondingly in the axial direction. When screwing-on the nut 2, the desired end position is reached when the lower end face 24 of the nut 2 is brought to rest against the ring 10.

As above-noted, the outer cylindrical surfaces 25 of the nut 12 are also surrounded by stator parts 17 which form a portion of an asynchronous-type electric motor. The stator parts 17, in this instance, are of ring-shaped design, as at this point of the fixture 13 there are no space or mounting difficulties preventing use of a ring-shaped stator. By supplying the a-c winding of the stator parts 17 within an a-c current, the nut 12 is likewise set in rotation. As a result, it is screwed onto the thread 11 until it comes to rest at the end faces 26 of the hydraulic part 15. The screw bolt 1 may then be stretched to the extent desired by feeding hydraulic fluid to the part 15 accordingly. Subsequently, stators parts 9 are again excited with an a-c current to bring the nut 2 again into contact with the ring 10. The pretensioning of the screw bolt 1 thus remains after relieving the hydraulic part 15 and after removing the nut 12.

What is claimed is:

1. In a fixture for simultaneously threading on and simultaneously turning the threaded nut means of a plurality of screw-bolts and the like, the fixture including: a support ring having recesses each of which receives a threaded nut means and its associated screw-bolt; separate rotating means for rotating each nut means attached to said support ring, each said rotating means functioning in the manner of a reversible electric motor; and hydraulic means for stretching said screw-bolts; the improvement comprising:

each said separate rotating means being associated with a particular recess and each including:
a stator part arranged in the surfaces of said particular recess which faces the nut means received by that particular recess, said stator part including an a-c winding and forming the stator portion of an asychronous-type electric motor whose rotor portion is formed by said nut means received by said particular recess.

2. In a fixture in accordance with claim 1, wherein each of said nut means includes a nut portion, the improvement wherein:

each of said stator parts is arranged in the surfaces of its particular recess which face the nut portion of the nut means received by that particular recess.

3. In a fixture in accordance with claim 1 wherein each of said nut means includes a nut portion and an extension portion extending above said nut portion, the improvement wherein:

each of said stator parts is arranged in the surfaces of its particular recess which face the extension portion of the nut means received by that particular recess.

4. In a fixture in accordance with claim 3, the improvement wherein:

each said nut portion includes teeth on its outer surface;
and each said extension portion is in the form of a sleeve which surrounds its associated screw bolt and includes teeth on its surface adjacent its associated nut portion which mesh with the teeth of said associated nut portion.

5. In a fixture in accordance with claim 1, the improvement wherein:
   each of said stator parts is one of sector-shaped and disk-shaped.

6. In a fixture in accordance with claim 1 wherein said nut means associated with each said screw-bolt is on the lower portion of that screw bolt and serves for pre-tensioning and said fixture includes further nut means on the upper portion of each of said screw-bolts for tightening that screw bolt, the improvement wherein:
   the asynchronous motor formed by each said nut means has a radial air gap;
   and each said further nut means forms the rotor of an electric motor having an axial air gap.

7. In a fixture in accordance with claim 1, the improvement wherein:
   the a-c winding of each of said stator parts is responsive to a frequency different from a line frequency.

8. In a fixture in accordance with claim 1, the improvement wherein:
   the surface of each of said recesses is provided with a slot in which is replaceably disposed the stator part associated with that recess.

9. In a fixture in accordance with claim 1, the improvement further comprising:
   means for shielding said stator parts from said support ring.

10. In a fixture in accordance with claim 1, the improvement wherein:
    each said nut means is provided on its outer surface with a squirrel cage winding.

* * * * *